United States Patent
Lohmar et al.

(10) Patent No.: US 11,228,456 B2
(45) Date of Patent: *Jan. 18, 2022

(54) TECHNIQUE FOR DELIVERING SCHEDULE INFORMATION FOR AN MBMS USER SERVICE

(71) Applicant: Telefonaktiebolaget LM Ericsson (publ), Stockholm (SE)

(72) Inventors: Thorsten Lohmar, Aachen (DE); Michael John Slssingar, Skärholmen (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/839,905

(22) Filed: Apr. 3, 2020

(65) Prior Publication Data

US 2020/0235953 A1    Jul. 23, 2020

Related U.S. Application Data

(63) Continuation of application No. 14/351,500, filed as application No. PCT/EP2012/004137 on Oct. 2, 2012, now Pat. No. 10,659,245.

(Continued)

(51) Int. Cl.
*H04L 12/18* (2006.01)
*H04W 4/06* (2009.01)
(Continued)

(52) U.S. Cl.
CPC ........... *H04L 12/189* (2013.01); *H04L 67/32* (2013.01); *H04W 4/06* (2013.01); *H04W 72/12* (2013.01)

(58) Field of Classification Search
CPC .................................................. H04L 12/189
See application file for complete search history.

(56) References Cited

U.S. PATENT DOCUMENTS

2005/0044061 A1  2/2005  Klemow
2005/0232271 A1  10/2005  Kettunen et al.
(Continued)

FOREIGN PATENT DOCUMENTS

GB    2406997      4/2005
JP    2007507914   3/2007
(Continued)

OTHER PUBLICATIONS

Universal Mobile Telecommunications System (UMTS);LTE; Multimedia Broadcast/Multicast Service (MBMS); Protocols and codecs; (3GPP TS 26.346 version 9.3.0 Release 9); ETSI TS 126 346 V9.3.0 (Jun. 2010)),herein 3GPP TS 26.346 (Year: 2010).*

(Continued)

*Primary Examiner* — Kodzovi Acolatse
*Assistant Examiner* — Abdeltif Ajid
(74) *Attorney, Agent, or Firm* — Rothwell, Figg, Ernst & Manbeck, P.C.

(57) ABSTRACT

Delivering schedule information for MBMS User Services. A method implementation of this technique comprises the steps of providing schedule information that describes a schedule for an MBMS User Service in the form re-occurring events. Additionally, or in the alternative, the schedule may be described in the form of start/stop lists. A User Service Description (USD) and the schedule information, which is linked to the USD (e.g., via an identifier such as a URI), are then delivered to a mobile client.

25 Claims, 7 Drawing Sheets

Related U.S. Application Data

(60) Provisional application No. 61/545,626, filed on Oct. 11, 2011, provisional application No. 61/550,580, filed on Oct. 24, 2011.

(51) Int. Cl.
    *H04L 29/08*     (2006.01)
    *H04W 72/12*     (2009.01)

(56) References Cited

U.S. PATENT DOCUMENTS

| | | | |
|---|---|---|---|
| 2006/0146745 A1* | 7/2006 | Cai | H04L 29/06027 370/328 |
| 2007/0063102 A1 | 2/2007 | Hwang et al. | |
| 2007/0124774 A1 | 5/2007 | Roberts et al. | |
| 2009/0052364 A1 | 2/2009 | Gonsa et al. | |
| 2010/0315987 A1 | 12/2010 | Kuo | |
| 2011/0188440 A1 | 8/2011 | Wang | |
| 2012/0195248 A1* | 8/2012 | Kuo | H04W 4/06 370/312 |
| 2012/0303745 A1* | 11/2012 | Lo | H04W 4/021 709/217 |
| 2012/0314642 A1 | 12/2012 | Xu | |
| 2013/0044670 A1* | 2/2013 | Jang | H04W 4/06 370/312 |
| 2015/0201310 A1 | 7/2015 | Terry | |

FOREIGN PATENT DOCUMENTS

| | | |
|---|---|---|
| JP | 2009531889 | 9/2009 |
| JP | 201035211 | 2/2010 |
| WO | 2006033521 | 3/2006 |
| WO | 2011097855 | 8/2011 |

OTHER PUBLICATIONS

Universal Mobile Telecommunications System (UMTS);LTE; Multimedia Broadcast/Multicast Service (MBMS); Protocols and codecs; (3GPP TS 26.346 version 9.3.0 Release 9); ETSI TS 126 346 V9.3.0 (Jun. 2010)) (Year: 2010).*
Indian Office Action dated Oct. 14, 2019, in Indian application No. 789/KOLNP/2014, 7 pages.
Chinese Search Report dated May 22, 2017, in Chinese application No. 201280050179.0, 3 pages.
Chinese Office Action dated Jun. 2, 2017, in Chinese application No. 201280050179.0 with English translation, 14 pages.
Japanese Office Action dated May 20, 2016, issued in Japanese Application No. 2014-534962, 6 pgs.
Qualcomm Inc. "Initialisation Segment incorporation in DASH over MBMS", 3GPP TSG-SA4 Meeting #65 Kista, Sweden. S4-110736, Aug. 19, 2011, 6 pgs.
Shinji Fukatsu et al., "Metadata Technologies in Multimedia Broadcasting for Mobile Terminals", NTT Technical, Journal, Telecommunications Association, May 1, 2011, vol. 23, No. 5, p. 19-23.
TELEFON AB LM ERICSSON et al. "Schedule and Reception Location Information" 3GPP SA4 #66, Tdoc S4-110977, 2011, 6 pages.
TELEFON AB LM ERICSSON et al. "MBMS Scheduling Information" 3GPP TSG-SA4 Meeting #67, S4-120268, 2012, 9 pages.
3rd Generation Partnership Project; Technical Specification Group Services and System Aspects; Multimedia Broadcast/Multicast Service (MBMS); Protocols and codecs (Release 10), 3GPP TS 26.346 V10.1.0, 2011, 1 page.
Samsung "MBMS: Requirements for the Scheduling message" 3GPP TSG RAN2 MBMS adhoc, R2-040756, 2004, 3 pages.
Qualcomm Incorporated "Discussion of FLUTE Enhancements" TSG-SA4#65 meeting, Tdoc S4-1100621, 2011, 3 pages.

* cited by examiner

UE, which is monitoring MCCH for TMGI #X is inside MBMS Service Area for TMGI #X at Session Start UE, which is monitoring MCCH for TMGI #X is outside MBMS Service Area for TMGI #X at Session Start

TECHNIQUE FOR DELIVERING SCHEDULE INFORMATION FOR AN MBMS USER SERVICE

CROSS-REFERENCE TO RELATED APPLICATIONS

This application is a continuation of U.S. application Ser. No. 14/351,500, having a section 371(c) date of Apr. 11, 2014, which is the U.S. National Stage of International Patent Application No. PCT/EP2012/004137, filed Oct. 2, 2012, which claims priority to i) U.S. Provisional Patent Application No. 61/550,580, filed on Oct. 24, 2011 and ii) U.S. Provisional Patent Application No. 61/545,626, filed on Oct. 11, 2011. The above identified applications are incorporated by this reference.

TECHNICAL FIELD

The present disclosure generally relates to Multimedia Broadcast/Multicast Services (MBMSs). In particular, a technique for delivering schedule information for an MBMS User Service is provided. The technique may be implemented in the form of methods, computer program products or devices.

BACKGROUND

MBMS is a Point-To-Multipoint (PTM) content delivery service specified by the $3^{rd}$ Generation Partnership Project (3GPP). MBMS enables an efficient delivery of content to multiple recipients in a cellular communications network. The content may be delivered in the form of content streams (e.g., mobile TV or radio programs) or content files (e.g., news updates).

Aspects of MBMS and evolved MBMS (eMBMS) are defined in 3GPP Technical Specification (TS) 26.346. Further information regarding MBMS, and in particular regarding the MBMS architecture in connection with cellular communications networks, is presented in F. Hartung et al., "Delivery of Broadcast Services in 3G Networks", IEEE Transactions on Broadcasting, Vol. 53, No. 1, March 2007, p. 188 to 199. As discussed therein, the central component of the MBMS architecture is a so-called Broadcast Multicast Service Center (BM-SC).

MBMS is functionally split into an MBMS Bearer Service and an MBMS User Service. FIG. 1 schematically illustrates the relationship between the MBMS Bearer Service and the MBMS User Service.

The MBMS Bearer Service shown in the lower half of FIG. 1 generally addresses MBMS transmission procedures below an Internet Protocol (IP) layer based on multicast or broadcast bearers. An individual MBMS Bearer Service is identified by a Temporary Mobile Group Identity (TMGI). A single, globally unique TMGI is allocated per MBMS Bearer Service by the BM-SC. Content delivery via the MBMS Bearer Service may involve PTM or Point-To-Point (PTP) transmissions.

The MBMS User Service shown in the upper half of FIG. 1 generally addresses application or service layer protocols and procedures based on, for example, the Real Time Protocol (RTP) for streaming services and the FLUTE protocol (see Internet Engineering Task Force, IETF, RFC 3926) for file delivery services. A FLUTE content delivery session is defined in a Session Description Protocol (SDP) file, which contains parameters that allow a mobile client to receive a mobile file delivery. Such parameters typically include an IP Multicast address, a User Datagram Protocol (UDP) port and the TMGI.

At present, there is no detailed timing and/or location information part of the FLUTE delivery session concept. As an example, there is no guarantee that a mobile client, also called User Equipment (UE) in 3GPP TS 26.346, is in an MBMS Service Area when an MBMS bearer is started. Further, an MBMS receiver shall continuously monitor the MBMS notification channel (i.e., the MBMS Control Channel, MCCH) and wait for an upcoming file delivery session, which is indicated by a TMGI on the MCCH. Continuously monitoring the MCCH is battery draining for a mobile client and will thus reduce its operating time.

TDocs S4-110448 (TSG-SA #64 meeting, 11 to 15 Apr. 2011, San Diego, Calif., USA) and S4-110621 (TSG-SA #65 meeting, 15 to 19 Aug. 2011, Kista, Sweden) discuss the issue of power efficient monitoring of MBMS transmissions. As confirmed therein, continuous monitoring of MCCHs for active MBMS bearers of interest and the associated unnecessary reception of MBMS data increases the power consumption of mobile clients. In this regard, TDoc S4-110621 suggests adding schedule information so that the mobile clients can deactivate MCCH monitoring when MBMS bearers of interest are certainly not active. Specifically, it is suggested that the FLUTE File Delivery Table (FDT) should describe the time window (by two parameters called startTime and endTime) when each file is scheduled to be broadcasted.

It has been found that transmitting schedule information in the FLUTE FDT suffers from several drawbacks. For example, the timing in the FDT is only applicable to files within the FLUTE session (this can be referred to as online for in-band information). In consequence, the timing of content (e.g., as identified by the service class) which is across different FLUTE flows cannot be properly described.

SUMMARY

Accordingly, there is a need for efficiently delivering schedule information in connection with MBMS User Services.

According to one aspect, a method is presented for delivering schedule information for an MBMS User Service for which a User Service Description (USD) is provided, wherein the method comprises the step of providing schedule information describing a schedule for an MBMS User Service, wherein the schedule is described in the form of one or more reoccurring events and/or one or more start/stop lists, and the step of delivering the USD and the schedule information to a UE, wherein the USD has a reference or link to the schedule information.

The schedule information and the USD may be delivered together or separately. In one implementation the schedule information is delivered during a Service Announcement procedure. The USD may likewise be delivered during the Source Announcement procedure or in any other procedure.

In one variant the schedule information is delivered out-of-band. In another variant the schedule information is delivered in-band via MBMS. In such an implementation the schedule information may be delivered with MBMS data or, alternatively, without MBMS data. Schedule information that is delivered in-band with the MBMS data may overwrite older (outdated) schedule information.

The schedule information may be identifiable in relation to other information (such as the USD). As an example, the schedule information may be identified by a Multipurpose Internet Mail Extensions (MIME) type.

The schedule information may specify an update duration or time. The update duration or time may cause, when having passed, the UE to fetch updated schedule information. The fetching may be performed via a unicast, or PTP, communication procedure. When an update time is used, the update time may be refreshed upon receiving a schedule information update in-band.

The schedule information may have any format. As an example, the schedule information may be provided in an Extended Mark-up Language (XML) format.

The USD may be valid for one or more MBMS sessions. As an example, the USD may be valid for multiple MBMS Sessions comprised by an MBMS User Service Session.

As stated above, the schedule information describes the schedule for an MBMS User Service. The schedule may reflect multiple MBMS Sessions comprised by an MBMS User Service Session.

The MBMS Sessions may be MBMS download sessions. In one implementation, the MBMS download sessions may be governed, or controlled, by the FLUTE protocol.

The schedule described by the schedule information may signal when the UE shall prepare for MBMS reception. The corresponding signaling may be used to put the UE in a power save mode when no MBMS reception is imminent.

The delivery of schedule information may be accompanied by the delivery of reception location information. The reception location information may identify a specific region for MBMS reception.

In one implementation, the schedule information and the USD may be delivered as separate items to the UE. Thus, the USD may not include the schedule information as such but only the reference or link to the schedule information. As an example, the schedule information and the USD may be delivered in separate fragments, instances, elements and/or files. Generally, one or both of the schedule information and the USD may be delivered as a file of its own.

According to a further aspect, a method is presented for determining schedule information for an MBMS User Service for which a USD is provided, wherein the method is performed by a UE and comprises the step of receiving the USD and schedule information, wherein the schedule information describes a schedule for an MBMS User Service, wherein the schedule is described in the form of one or more re-occurring events and/or one or more start/stop lists, wherein the USD has a reference or link to the schedule information, and the step of determining the schedule information via the reference or link from the USD.

The method according to the further aspect may additionally comprise preparing for reception based on the schedule information. Preparing for reception may comprise starting monitoring of an MCCH for an MBMS Session. Additionally, or as an alternative, preparing for reception may comprise activating an MBMS chipset of the UE.

An initiated MBMS User Service may be paused by the UE based on the schedule information. As an example, pausing an initiated MBMS User Service may comprise stopping monitoring of the MCCH. Alternatively, or in addition, pausing an initiated MBSM User Service may comprise deactivating an MBMS chipset of the UE.

The technique presented herein may be realized in the form of software, in the form of hardware, or using a combined software/hardware approach. As regards a software aspect, a computer program product comprising program code portions for performing the steps presented herein when the computer program product is executed on a processor (e.g., of a computing device) is provided. The computer program product may be stored on a computer-readable recording medium such as a memory chip, a CD-ROM, a hard disk, and so on. Moreover, the computer program product may be provided for download via a network connection onto such a recording medium.

Also provided is a device for delivering schedule information for an MBMS User Service for which a USD is provided, wherein the device comprises a functionality adapted to provide schedule information describing a schedule for an MBMS User Service, wherein the schedule is described in the form of one or more re-occurring events and/or one or more start/stop lists, and a functionality adapted to deliver the USD and the schedule information to a UE, wherein the USD has a reference or link to the schedule information.

The device may be adapted to deliver the schedule information in various ways. As an example, the schedule information may be delivered during a Service Announcement procedure. Additionally, or in the alternative, the schedule information may be delivered out-of-band or in-band via MBMS. Especially in the latter case, the schedule information may be delivered with MBMS data (or, alternatively, without such data).

The schedule information may specify one or more additional parameters. As an example, the schedule information may specify an update duration or time.

Still further, a UE is presented for determining schedule information for an MBMS User Service for which a USD is provided, wherein the UE comprises a functionality adapted to receive a USD and schedule information, wherein the schedule information describes a schedule for an MBMS User Service, wherein the schedule is described in the form of one or more re-occurring events and/or one or more start/stop lists, and a functionality adapted to determine the schedule information via the link or reference from the USD.

Also provided is an MBMS system comprising the device for providing schedule information as well as the UE presented herein. The MBMS system may conform to any of the MBMS and eMBMS specifications.

BRIEF DESCRIPTION OF THE DRAWINGS

Further aspects, details and advantages of the technique presented herein will become apparent from the following description of exemplary embodiments in conjunction with the drawings, wherein.

DETAILED DESCRIPTION

In the following description of exemplary embodiments, for purposes of explanation and not limitation, specific details are set forth such as specific sequences of signalling steps in order to provide a thorough understanding of the technique presented herein. It will be apparent to one skilled in the art that the technique may also be practised in other embodiments that depart from these specific details.

Moreover, those skilled in the art will appreciate that the services, functions and steps explained herein below may be implemented using software functioning in conjunction with a programmed processor, an Application Specific Integrated Circuit (ASIC), a Digital Signal Processor (DSP) or a general purpose computer. It will also be appreciated that while the following embodiments will primarily be described in the context of methods and devices, the technique presented herein may also be embodied in a computer program product as well as in a system comprising a computer processor and a memory coupled to the processor, wherein the memory is encoded with one or more programs that cause the processor to perform the services, functions and steps disclosed herein.

Figure 1:
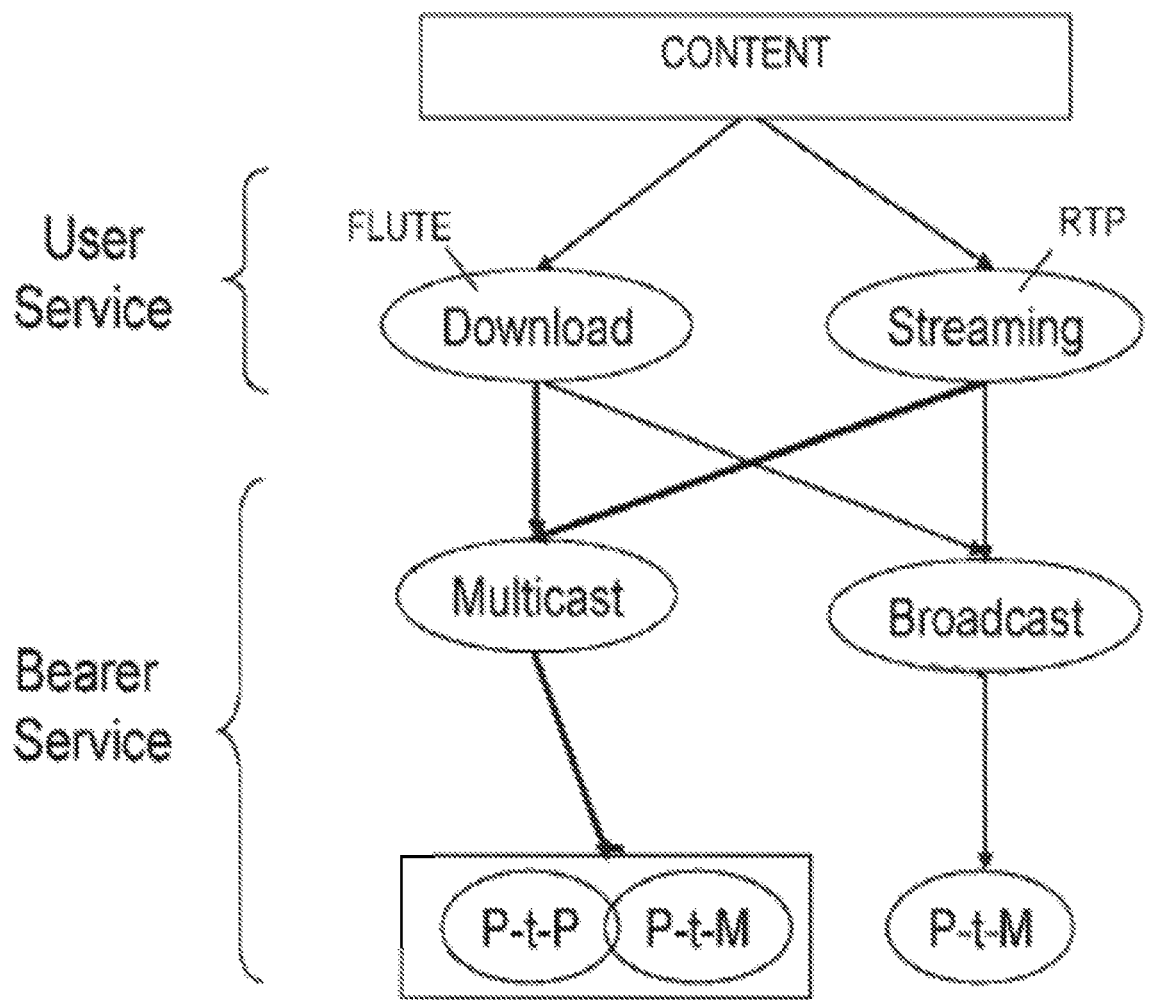
FIG. 1 schematically illustrates the concepts of MBMS Bearer Service and MBMS User Service.

In the following, certain aspects of an MBMS system in which embodiments of the technique presented herein can be practiced will be described first. The MBMS system described hereinafter may be functionally implemented as illustrated in FIG. 1 described above.

3GPP TS 26.346 differentiates between MBMS Users Services and MBMS User Service Sessions (see clause 4.2) and MBMS Sessions (Broadcast Session and Multicast Session are separately defined in clause 3.1). An MBMS Session is defined by an MBMS bearer identifier (i.e., the TMGI) and the particular MBMS Service Area for which the MBMS Session is started. An MBMS Session on an MBMS bearer is started with the MBMS Session Start Procedure and deactivated using MBMS Session Stop procedure.

In some of the following embodiments, the term "Delivery Session" will be used synonymously for a MBMS User Service Session. A Delivery Session may be limited in the context of such embodiments to "MBMS Download Sessions" (e.g., based on the FLUTE protocol). The timing of the Delivery Session (i.e., t-line) conventionally does not provide any information about the timing of an MBMS Session (a Delivery Session may generally span over multiple MBMS sessions).

A Delivery Session is defined by an SDP file in combination with a USD file. The SDP file contains the TMGI identifying the MBMS bearer used for delivering the content. The SDP file is provided to the mobile clients, also called UEs herein, during Service Announcement (SA).

The MBMS Bearer Service definition includes an MBMS Notification Phase, which allows the network to inform UEs inside the MBMS Service Area (target broadcast area) about imminent MBMS transmissions (see 3GPP TS 23.246). As indicated above, an MBMS bearer is identified by a TMGI, which can be regarded as a group identifier. The MCCH carries information about active MBMS bearers in a specific cell. The network indicates any change of the MCCH explicitly, so that UEs do not always have to read the MCCH. The UEs know the TMGI of interest from the Service Announcement, which is distributed on a service or application layer.

An MBMS Session using an MBMS Bearer Service can be started and stopped from the BM-SC using the MBMS Session Start and Stop procedures. The radio network changes the content of the MCCH as a result of an MBMS Session Start and Stop. An MBMS Session may be started in a specific MBMS Service Area. The MBMS Service Area may be smaller than the mobile communications network (e.g., a specific Public Land Mobile Network, PLMN). UEs can only receive the MBMS data of the MBMS Session over an MBMS bearer when they are inside the MBMS Service Area.

An MBMS Session may, for example, be used for live video and file distribution services. Both types of services may be limited in time and may also be only available in certain geographical areas (i.e., within the MBMS Service Area). The Service Announcement information (SDP files and USD files) conventionally does not include timing information as to when the MBMS Session is started or stopped. It should be noted that an SDP file may be valid for a much longer time than an MBMS bearer is active. Moreover, the SDP file may describe data delivery using successive MBMS Sessions (see 3GPP TS 22.246 clause 5). As a result of this situation, UEs should continuously monitor the MBMS MCCH to determine whether or not an MBMS bearer of interest (identified by a TMGI) is started.

Figure 2:
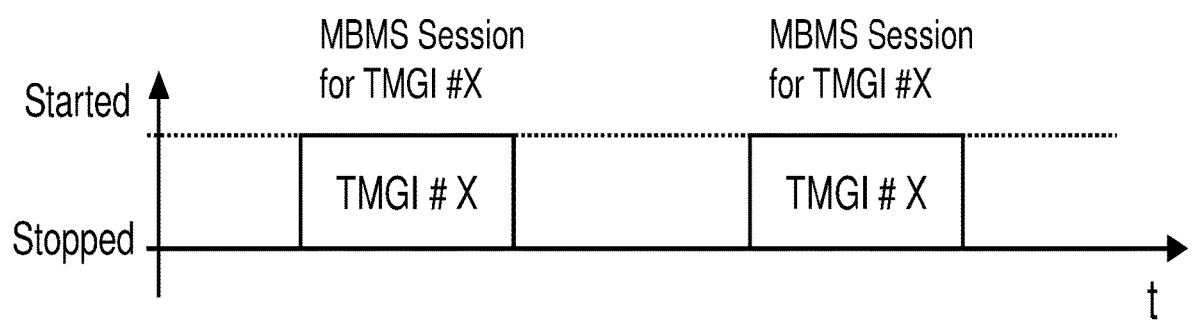
FIG. 2 schematically illustrates multiple MBMS Sessions associated with a single TMGI.

As stated above, MBMS Service Announcement information (SDP and USD files) may be valid for one or more MBMS Sessions (i.e., successive MBMS Sessions). This means that the MBMS bearer (identified by a TMGI) can be started and stopped several times as illustrated in FIG. 2 for a fragmented MBMS Session on MBMS bearer with TMGI no. X ("TMGI #X"). In FIG. 2, the MBMS Session is started twice, for instance on two subsequent Saturdays between 1400 h and 1600 h. The UEs, which are interested in the content of that MBMS bearer, are conventionally not aware about this schedule. According to the 3GPP specifications, those UEs have to continuously monitor the MCCH for the start of the MBMS bearer. Obviously, this monitoring unnecessarily consumes battery power.

Moreover, a UE is only aware about the MBMS Service Area when the UE is inside the MBMS Service Area while an MBMS Session is active. In this case, the UE finds the TMGI of the service of interest on the MCCH. If the UE is outside the MBMS Service Area or if the MBMS Session is not active, then the UE is not aware of the MBMS Service Area.

Figure 3A:
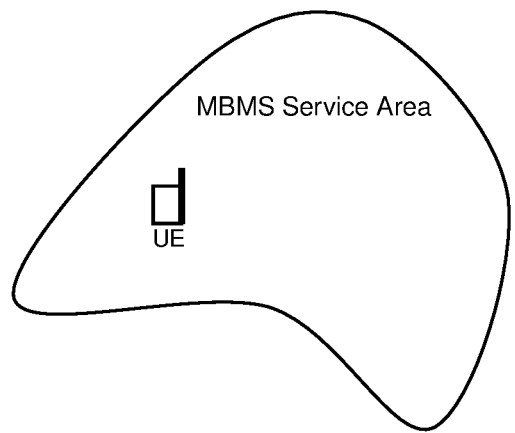
FIG. 3A illustrates a possible geographical relationship between MBMS Service Areas and UEs.
Figure 3B:
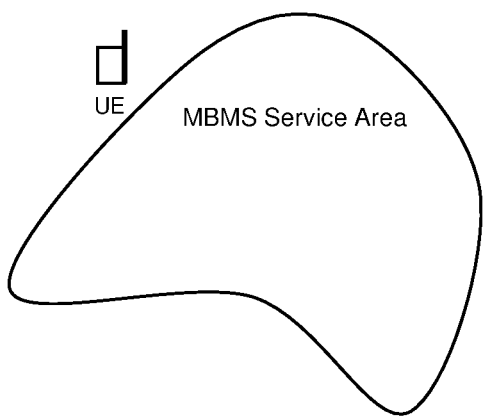
FIG. 3B illustrates a possible geographical relationship between MBMS Service Areas and UEs.

FIGS. 3A and 3B illustrate these scenarios. The UE in FIG. 3A is inside the MBMS Service Area. When the MBMS Session of TMGI #X is active, then the UE finds TMGI #X on the MCCH and can receive the associated content. If the MBMS Session is not active, then the UE cannot determine the reason for not receiving any traffic. Either the UE does not receive MBMS traffic because it is outside the MBMS Service Area or no MBMS bearer with TMGI #X is started.

The UE in FIG. 3B is outside the MBMS Service Area. The UE also cannot determine the reason why it is not receiving content for MBMS Bearer with TMGI #X.

The probability of "UE is inside the MBMS Service Area, while the MBMS Session is active" depends on the service type and the user-behavior. For instance, the UE is less often inside the MBMS Service Area when the user of the UE lives in a sub-urban or rural area.

One aspect presented in the following embodiments is based on the concept that an MBMS User Service initiated on the UE is "pausing" monitoring of the MCCH for the MBMS bearer of interest. To this end, the network provides schedule and, optionally, reception location information to the UE as will now be explained in more detail.

Figure 4:
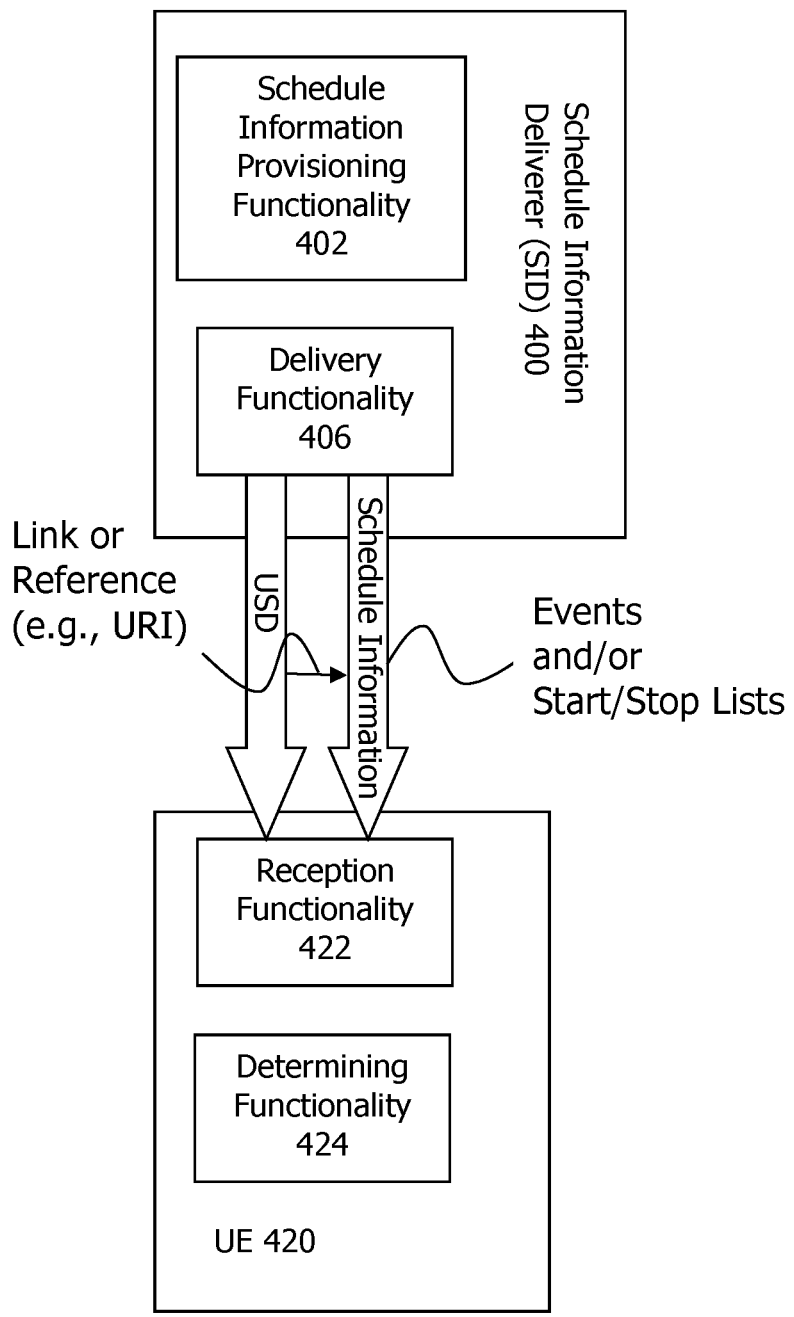
FIG. 4 illustrates first device embodiments of a schedule information deliverer and a schedule information recipient.

FIG. 4 illustrates an embodiment of an MBMS system comprising two device embodiments 400, 420. Specifically, a device 400 for delivering schedule, or timing, information (also called Schedule Information Deliverer, SID, hereinafter) and a UE 420 configured here as a mobile client for receiving the schedule information are depicted. The schedule information is provided for MBMS User Services. The MBMS User Services, or sessions thereof, are associated with a USD as generally described in 3GPP TS 26.346 (see, e.g., clause 5).

As illustrated in FIG. 4, the SID 400 comprises a schedule information provisioning functionality 402 as well as a delivery functionality 406 capable of communicating with the UE 420. The SID 400 may be realized as a part of or in the form of a BM-SC.

The UE 420, in turn, comprises a reception functionality 422 capable of communicating with the delivery functionality 406 of the SID 400. Further, a determining functionality 424 is comprised by the UE 420.

The delivery functionality 406 of the SID 400 is configured to deliver schedule information as well as the USD to the reception functionality 422 of the UE 420. In one implementation, both the USD and the schedule information are delivered as separate items of information but together during a Service Announcement procedure. In other implementations, the USD and the schedule information could be delivered at different points in time. Moreover, alternative procedures may be used for delivery.

The operation of the SID 400 and the UE 420 will in the following be described in more detail with reference to the flow diagram 500 of FIG. 5.

In an initial step 520, the schedule information provisioning functionality 402 of the SID 400 provides schedule, or timing, information describing a schedule for the MBMS User Service. The schedule is described in the form of one or more re-occurring events. Additionally, or in the alternative, the schedule is described in the form of one or more start/stop lists.

After step 520, the delivery functionality 406 of the SID 400 delivers, in step 530, the USD and the schedule information as separate items of information (optionally at spaced apart points in time, i.e., individually) to the UE 420. The delivery may occur for an upcoming or previously started MBMS download session via the FLUTE protocol (see FIG. 1).

The USD delivered in step 530 has a reference, or link, to the schedule information. Here, the USD does not contain the schedule information as such, but a reference, or link (e.g., a plain identifier, a Uniform Resource Identifier, URI, and so on). The reference or link enables the UE 420 to identify, or determine, the schedule information elsewhere. As such, the schedule information does not have to be included in, or transmitted with, the USD, and the USD and schedule information do not have to be delivered at the same time. Moreover, this approach enables an easy update of the schedule information (as the USD does not have to be delivered again in such a case).

Delivery step 530 may occur, at least as far as the USD is concerned, in the context of a Service Announcement procedure. The schedule information may likewise be delivered during the Service Announcement procedure or at a later point in time, and either in-band (via MBMS, optionally together with MBMS data) or out-of-band.

Figure 5:
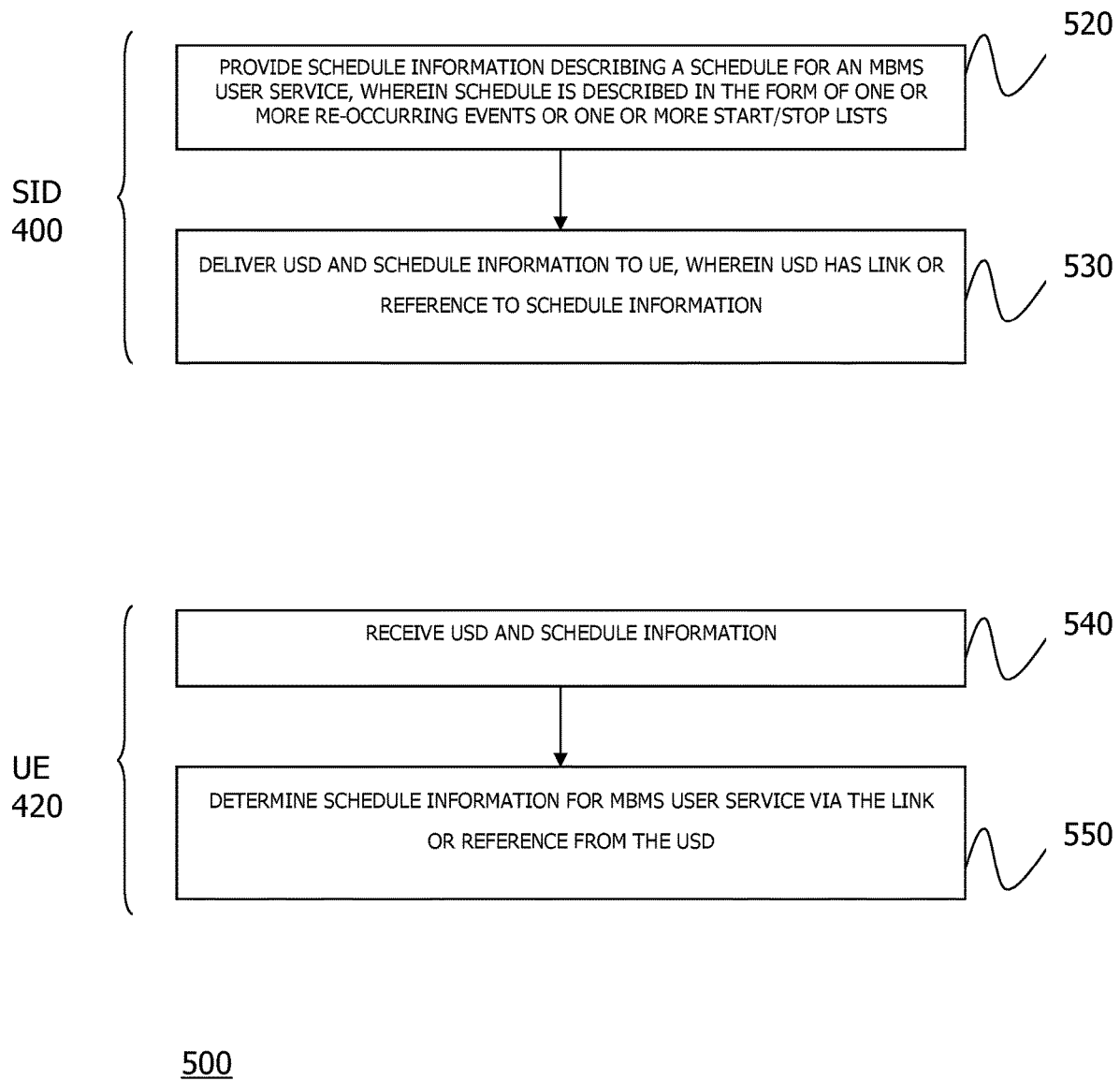
FIG. 5 illustrates method embodiments of operating the schedule information deliverer and the schedule information recipient of FIG. 4.

The USD and schedule information are received, as indicated by step 540 in FIG. 5, by the reception functionality 422 of the UE 420 either at the same time or at different points in time. In a further step 550, the determining functionality 424 determines the (location of) the schedule information via the link or reference from the USD. In this connection the determining functionality 424 may (de-)reference the schedule information from the USD (e.g., via the common identifier).

In further steps not illustrated in FIG. 5, the UE 420 may process the content of the schedule information. In connection with such a processing, the UE 420 may prepare for reception based on the schedule information (e.g., the UE 420 may start monitoring of the MCCH for an MBMS session by activating an MBMS chipset of the UE or otherwise). Moreover, the UE 420 may pause an initiated MBMS User Service based on the schedule information (e.g., by stopping monitoring of the MCCH and/or deactivating an MBMS chipset of the UE 420). The UE 420 may comprise suitable functionalities (not shown) adapted to perform one or more of those procedures.

Figure 6:
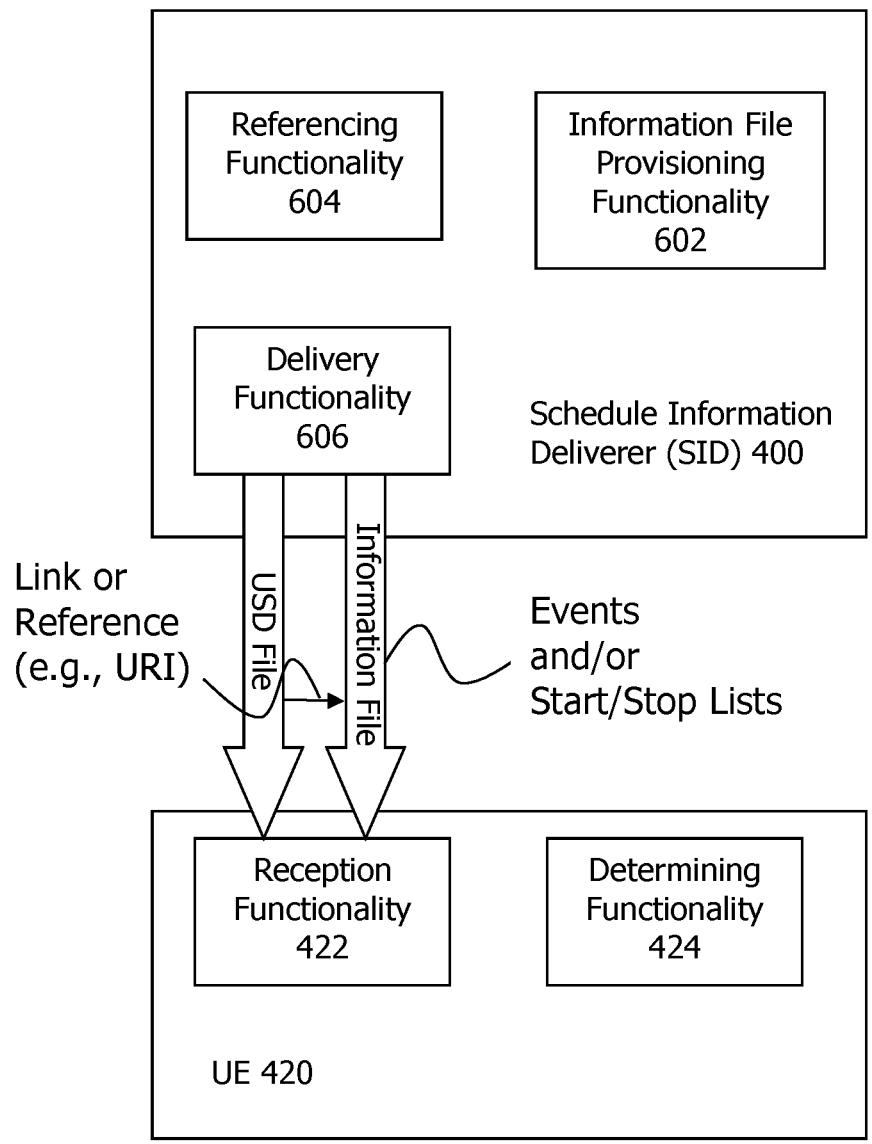
FIG. 6 illustrates second device embodiments of a schedule information deliverer and a schedule information recipient.

FIG. 6 illustrates two alternative device embodiments for the SID 400 and the UE 420. In the present embodiments, the USD and the schedule information are delivered via dedicated files (or file portions). Additionally, or alternatively, at least one of the USD, the link (or the reference) and the schedule information may comprise or be delivered in the form of a metadata fragment as defined in 3GPP TS 26.346 (see, e.g., clause 5).

As illustrated in FIG. 6, the SID 400 comprises an information file provisioning functionality 602, a referencing functionality 604 and a delivery functionality 606 capable of communicating with the UE 420. The information provisioning functionality 602 of the SID 400 is configured to provide an information file. The information file contains the schedule, or timing, information. The referencing functionality 604 of the SID 400 references the information file from the USD file. To this end, the USD file and the information file are associated, or linked, with each other. The delivery functionality 606 of the SID 400 is configured to deliver the infor-mation file as well as the USD file to the UE 420. In one implementation, both files are delivered together during a Service Announcement procedure. In other implementations, the files could be delivered separately.

The UE 420 again comprises a reception functionality 422 capable of communi-cating the delivery functionality 606 of the SID 400. Further, a referencing functionality 604 is comprised by the UE 420. The referencing functionality 604 (de-)references the information file from the USD file for determining the schedule information via the link or reference from the USD file. The referencing functionality 604 thus functionally corresponds to the determining func-tionality 424 of FIG. 4.

In the following, the device and method embodiments generally depicted in FIGS. 4, 5 and 6 will be described in more detail. Specifically, more detailed embodiments of the schedule file (which is optional), the schedule information and the schedule will be presented first (partially in combination with optional location information). Thereafter, various embodiments for processing and exploiting the schedule information (and the optional location information) will be described.

The schedule of an MBMS User Service can generally be described in the information file in form of durations (User Service should start monitoring after X seconds again), in form of re-occurring events (User Service should monitor for associated MBMS bearers every Saturday between 1400 h and 1600 h) or in form of start/stop lists.

Since the UE 420 as illustrated in FIGS. 4 and 6 may leave an MBMS Service Area (see FIG. 3B) at any time, the information file (also called schedule file hereinafter) may describe a "minimal update duration". When the minimal update duration has passed and the UE 420 has not received any update in-band with the MBMS data, then the UE 420 could or should use unicast (i.e., PTP) to fetch updated schedule information for the User Service. The intention of the update mechanism is to keep the solution working, even when the UE 420 leaves the MBMS Service Area.

The optional reception location information may be based here on Cell IDs or Location Area Codes (LAC). Both, the Cell ID and the LAC can be received by UEs in idle mode. Modern phone operating systems provide Application Programming Interfaces (APIs) to monitor the location (e.g., CellLocation API in Android). The reception location information can be described in form of a list of Cell IDs or LACs, where the MBMS User Service uses MBMS bearers for data distribution (i.e., MBMS Service Area).

MBMS Service Areas may be very large, covering entire regions. A file (with reception location information) may thus become very large in size when the MBMS Service Area is very large. The solution to overcome the issue of large files is to allow partitioning of the reception location description file into portions and describe an update region: When the UE 420 leaves the described region then the UE 420 should update the reception location file providing its own location.

The schedule and reception location information file may be delivered to the UE 420 During Service Announcement as a reference from the User Service Description (USD) file or In-band with the MBMS data.

The schedule and reception information file may be identified by the exemplary MIME type "application/mbms-schedule-and-rx-location+xml". When the MBMS download receiver (i.e., the UE 420) finds a file with that MIME type, it handles the schedule and reception location information file accordingly.

An example schedule and reception location Information file is given below in an exemplary XML format:

```
<?xml version="1.0" encoding="UTF-8"?>
<scheduleAndRxLocationInformation
xmlns="scheduleAndRxLocationInformationSchema"
xmlns:xsi="http://www.w3.org/2001/XMLSchema-instance"
<Schedule update="3530304000">
<TimeDate start ="3529490400" duration="7200"/>
<TimeDate start="3530095200" duration="7200"/>
</Schedule>
<ReceptionLocation update-lac="1600, 1602, 1603, 1624">
<lac ids="1601, 211"/>
<cell ids="15845, 21391, 21392"/>
</ReceptionLocation>
</scheduleAndRxLocationInformation>
```

The schedule element provides here start and duration information, i.e., when UEs shall prepare for MBMS reception (start monitor MCCH for MBMS Session).

There are other alternatives to describe the schedules than explicit lists.

The ntp timestamp 3529490400 corresponds to Saturday, $5^{th}$ November, 1400 h (CET). The ntp timestamp 3530095200 corresponds to Saturday, $12^{th}$ November, 1400 h (CET). The ntp timestamp 3530304000 corresponds to $15^{th}$ November, 0000 h (CET), which is the time at which the UE should have received an update at the latest (note, the value is refreshed when the UE receives an update in-band).

The ReceptionLocation element provides coarse-grain reception location information (LAC) and fine-grain reception location information (Cell).

The above embodiments may, as an example, be implemented as follows in an exemplary 3GPP environment.

TS 26.346 could be extended with an optional "Schedule and Reception Location" information file, which describes schedule information of the associated MBMS Session and also reception location information. This enables the UE 420 to pause initiated MBMS User Services (stop MCCH monitoring for the TMGIs of the MBMS User Service when not needed). It should be possible to only provide schedule information and only provide location information. In other words, the location information may, for example, be optional and may thus be omitted (giving rise to a "pure" information file with schedule information).

The schedule and reception location information file could or should be a file of its own, so that it can be received in-band via MBMS or out-of-band via HTTP. It can be linked from the USD and can be updated (overwritten) in-band with the MBMS Data.

The schedule and reception location information file could or should allow for updates. There could or should be at least a timer based update mechanisms In the following some further embodiments are described in the terms of an exemplary 3GPP system. It is to be understood that this description can be generalized to other systems in line with the general features as described herein. In the terms of 3GPP, the disclosure proposes mechanisms of how the UE 420 of FIGS. 4 and 6 (user terminal) shall effectively receive mobile file broadcast delivery. The following embodiments partially present scenarios of how the schedule information and/or the reception location information as received with the information file (see, e.g., FIGS. 4, 5 and 6) can be exploited.

Here, the term user terminal or phone is a generalisation of any UE 420 being capable to send and receive data in a data network. In particular the phone shall be capable of receiving MBMS file delivery (aka MBMS download delivery method).

In general terms, the UE 420 is configured to deactivate the MBMS reception parts, in particular to deactivate the monitoring of the control channel being configured to inform on the upcoming multicast transmission even when an application on the UE 420 is generally registered for multicast reception of this service. In particular the deactivation and activation of the monitoring is based on schedule and reception location information (e.g., as discussed above with reference to FIGS. 4, 5 and 6).

The multicast transmission, for example in terms of a 3GPP MBMS Session, is provided over MBMS bearers. As explained above, the MBMS Session may be identified by any identifier being able to identify a group, like the TMGI (see FIG. 2). The TMGI may be provided during the Service Announcement procedure. Further, some of the MBMS Sessions may be identified as particular interesting for a user. This may be done by means of TMGI of interest, in terms of 3GPP.

In an embodiment said control channel is the MCCH. An upcoming multicast transmission is notified on the MCCH by listing an associated TMGI with the associated traffic channel access information on the MCCH. In the following the terms MCCH monitoring or MBMS monitoring will be used in this regard.

As explained above, it is proposed in the present embodiments to allow the UE 420 to deactivate reception of multicast control information (thus, MCCH monitoring) when (in time) and where (location) there is certainly no upcoming multicast transmission for the service of interest. Generally, this procedure is applied when the UE 420 contains at least one application interested to receive the said multicast transmissions in order to avoid that the UE 420 is continuously monitoring the MCCH for the group identifier (e.g., TMGI) of interest.

As explained above, it is proposed that the UE 420 is capable of receiving detailed scheduling and reception area information (or updates of it). This may be realised as part of the MBMS file delivery method or using the Hypertext Transfer Protocol (HTTP).

In one variant it is proposed that in case the file is received via MBMS download delivery (e.g., carried by the FLUTE protocol), a Delivery Method Handler identifies the received file based on any available and preferred way, for example by means of a unique MIME type or a well-known filename/URI. Said information may be forwarded for activating and deactivating the MCCH channel.

The UE 420 may know its (rough) location based on any available and preferred method; for example based on a Location Area Code (LAC) or Cell ID or even Geo-Coordinates, which is provided by the system. Alternatively, the UE 420 may use the Global Positioning System (GPS) or any other satellite-based positioning system to determine location information. A Schedule and Reception Location Handling function in the UE 420 may continuously (or through timers) monitor the need for activation or deactivation of MBMS reception for services of interest.

Further it is proposed that when the schedule information indicates to activate or deactivate MBMS monitoring for a service, the UE 420 first checks the location information, whether or not MBMS reception is possible at the current location at all.

Thus, the UE 420 may be adapted to deactivate its MBMS reception parts (e.g., in terms of an MBMS chipset), when it is certainly not in coverage, in particular when there is seldom file delivery traffic planned for a service as indicated in the schedule information for that service.

In a further variant, the UE 420 of the telecommunication system can be adapted to the presented method. In this case the UE 420 may comprise a handling entity adapted to activate and deactivate MCCH monitoring based on schedule and reception location information for one or more services. Further it is proposed to have a processing entity adapted to process the schedule and reception location information file (or updates of it). Said entity may be realised by a Schedule and Reception Location Handling function.

Figure 7:
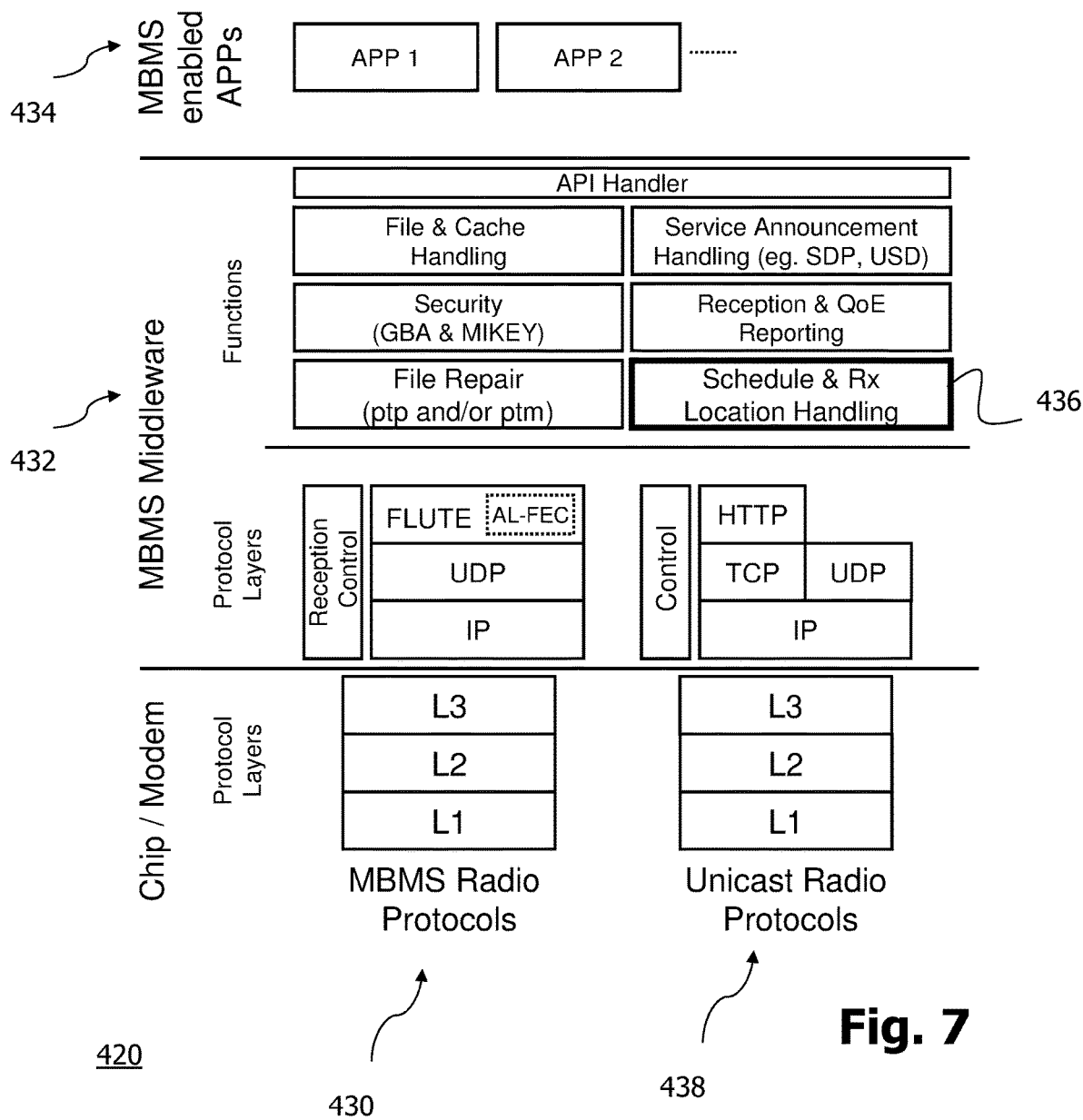
FIG. 7 illustrates a more detailed device embodiment of a schedule information recipient like the one of FIG. 4 or 6.

In one embodiment depicted in FIG. 7, it is proposed that the UE 420 comprises one or more MBMS radio chipsets 430 (each handling Layer 1 (PHY), Layer 2 (RLC/MAC), Layer 3 (RRC)), MBMS middleware 432 (IP layer up to MBMS download delivery method handling) and one or more MBMS enabled applications 434. The MBMS radio chipset 430 is also called modem and may be integrated with other radio related functions. A Schedule and Reception Location Handling function 436 is preferably located within the middleware 432. The Schedule and Reception Location Handling function 436 may comprise the reception functionality 422 and the referencing functionality 604 discussed above with reference to FIGS. 4 and 6. In alternative implementations, the reception functionality 422 may fully or partially be realized by the MBMS radio chipset 430, while the referencing functionality 604 remains in the Schedule and Reception Location Handling function 436.

According to an implementation, the MBMS middleware 432 is enabled to control (activate/deactivate) the MBMS chipset 430 (in terms of de-activating the monitoring of MCCH in particular for TMGIs of interest) based on schedule and reception location information (handled in the Schedule and Reception Location Handler function 436). The "TMGI(s) of interest" uniquely describe the multicast transmissions or MBMS Sessions of interest. This allows the UE 420 (e.g., a phone) to save battery by avoiding MCCH monitoring (by not receiving the MBMS physical channels). Thus it is proposed to provide a separate middleware function such as the Schedule and Rx Location Handler function 436 which is adapted to process the information and control the MBMS chipset 430 accordingly (and, thus, control the reception of MBMS Physical Channels).

FIG. 7 depicts the client side protocol stack (phone) and also generic MBMS middleware functions. The MBMS middleware 432 implements some new protocols such as FLUTE (RFC 3926) and, optionally, application layer Forward Error Correction (FEC) like Raptor, LDPC or Reed Solomon FEC. The MBMS middleware 432 may re-use available protocols such as HTTP, Transport Control Protocol (TCP) and UDP and available functions such as location information. It may be possible to integrate the MBMS middleware protocols and functions into an Operating System (OS) like Android, which also includes generic functions for communications and GUI handling.

Existing (unicast) protocols like HTTP use existing unicast functions of a unicast radio chipset 438 (also called radio modem). The new MBMS/broadcast protocols such as FLUTE use new, MBMS related chipset/modem functions, which can be implemented as extension of existing unicast chips or even as a separate chipset.

Generic middleware functions control the radio protocols using control functions. In the MBMS case, the middleware 432 activates or deactivates reception of MBMS bearers, which are identified by a TMGI (which is again uniquely associated with at least one service). When the middleware 432 activates the reception of a MBMS bearer (identified through a TMGI, which was provided to the UE 420 through Service Announcement) in the chipset 430, the radio layers activate the reception of the MCCH in order to monitor the presence of MBMS bearer of interest (as described through the TMGI) from the currently received cell.

If the TMGI is not immediately found on MCCH, the chipset 430 may continuously receive the MCCH and monitor the availability of the TMGI(s) of interest.

In one embodiment it is proposed that a control node (such as the SID 400 of FIGS. 4 and 6) being located in a network is configured to provide detailed scheduling and reception area information about multicast delivery files (optionally for each service separately) to the clients.

In one embodiment it is proposed that the control node provides detailed scheduling information and also MBMS broadcast coverage information (or reception area from terminal perspective), which is processed automatically in the user terminal being capable of handling the implementation of the MBMS download delivery method in the phone (e.g., MBMS middleware 432).

In one embodiment it is proposed that the control node (e.g., in a Schedule and Reception Location Handling function) uses information about the multicast delivery to produce the scheduling information. For instance an operator may use a file delivery session to deliver content only during night-times. Further, some MBMS Services as nightly cache fill or sports-events on week-ends have a fixed schedule.

Moreover, the control node may be adapted to have information about the target broadcast area.

In a further embodiment it is proposed that the scheduling of the transmission is to be described in any available and preferable way, for example by providing also re-occurring events, start/duration lists, start/stop lists or deactivation durations and the terminals activate/deactivate MBMS receivers (chip set parts to receive the MBMS Physical Channel) according to the received schedule.

In a further embodiment, a control node (such as the SID 400 of FIGS. 4 and 6) of the telecommunication system can be adapted to the presented method. In this case the control node comprises a receiver for receiving information regarding the MBMS file delivery comprising the broadcast coverage and time for services and a processing unit for generating scheduling information and MBMS broadcast coverage information as well as a transmitter (such as the delivery functionality 406 or 606 of FIG. 4 or 6, respectively) for transmitting the scheduling information towards the users (i.e., UE 420).

In the following more detailed examples of the embodiments are described in the terms of a 3GPP system. However, it is to be understood that this description can as well as be generalized to other systems in line with the general features as described under the basic concept.

One aspect presented herein is to provide detailed scheduling and, optionally, reception area information as part of the MBMS file delivery method. The intention is to allow terminals such as the UE 420 of FIGS. 4 and 6 to switch off MBMS reception (thus, MCCH monitoring) when (in time) and, optionally, where (location) there is certainly no upcoming transmission. Some MBMS services as nightly cache fill or sports-events on week-ends have a fixed schedule and the known target broadcast area.

A dedicated Scheduling and Reception Location Fragment (as an implementation of the information file describe above) may be distributed in-band like the associated delivery procedure description or may be provided as a default within the MBMS USD. The Scheduling and Reception Location Fragment may contain only scheduling information or reception location information or both.

The MBMS File Delivery client identifies the Schedule and Reception Location Fragment based on a dedicated and well-known MIME type in case of in-band reception. The fragment is received like any other file, but then processed by the MBMS File Delivery client and not forwarded to upper layer applications.

The content of the Schedule and Reception Location Fragment may be XML formatted (see the pseudo-code example presented above). A general fragment may contain different schedule formats such as re-occurring schedules like once per day, once per week or once per month. Alternatively, the schedule information may be described as one or more start times and durations. MBMS clients (middleware 432) should process the scheduling information when received or updated and activate/deactivate MBMS receivers (chipset 430).

When also reception location information is defined in the fragment, the MBMS receiver should check whether the phone is in the described coverage area before activation. The phone should monitor its own location during MBMS reception and deactivate MBMS receivers (chipsets 430) when moving out of coverage.

As explained above, reception location information may be described as Location Area Codes (LACs) or Cell IDs, which are always provided by the radio access system. Terminals do not need to activate an interactive bearer.

The fragment may contain validity information, which tells the receiver the maximal validity of the fragment. Terminals within the coverage area of the service (see FIG. 3A) may frequently receive updates of the schedule and reception location information. However, terminals outside of the coverage (see FIG. 3B) may not receive any coverage information and may have incorrect information when the system decides to change the coverage area.

During a fragment update request, the terminals could or should provide their own LAC or CellId, so that the system may tailor the schedule and reception location fragment. In particular the description of the reception location information (broadcast target area) may be large and the system may provide only the relevant parts.

A new terminal function (the Schedule and Reception Location Handling function 436, see FIG. 7 and below), is responsible for activation and deactivation of the MCCH monitoring (resulting in MBMS Physical Channel reception activation and deactivation), based on schedule and reception location information, which is available for each MBMS service. The function either receives the schedule and reception location information file (or updates of it) through the MBMS download delivery method associated with that service or using HTTP. In case it is received via MBMS download delivery method (e.g., carried by the FLUTE protocol), the Delivery Method Handler identifies the file based on, for example, a unique MIME Type, a unique filename or URI and forwards it to the Schedule and Reception Location Handler function 436, which handles the information for all services or for each service separately.

The Schedule and Reception Location Handler function 436 may update the schedule and reception location information file based on timeouts (timer based) and/or based on location (leaving the validity described area of the Schedule and Reception Location Information file). Deactivation of the MCCH monitoring for one or more TMGIs of interest may lead to a stop of reception of any MBMS Physical Channels As has become apparent from the above description of exemplary embodiments, the technique presented herein allows terminals such as the UE 420 of FIGS. 4 and 6 to save battery during times and, optionally, at locations, when/where MBMS reception and not foreseen by the system.

It is believed that many advantages of the technique disclosed herein will be fully understood from the forgoing description, and it will be apparent that various changes may be made in the form, construction, and arrangement of the exemplary embodiments without departing from the scope of the invention, or without sacrificing all of its advantages. Because the technique presented herein can be varied in many ways, it will be recognized that the invention should be limited only by the scope of the claims that follow.

The invention claimed is:

1. A method of delivering schedule information for a Multimedia Broadcast/Multicast Service (MBMS) User Service for which a User Service Description (USD) is provided, the method comprising:
   providing schedule information describing a schedule for the MBMS User Service, wherein the schedule is described in the form of one or more re-occurring events and/or one or more start/stop lists; and
   delivering the USD and the schedule information to a user equipment (UE), wherein the USD has a reference or link to the schedule information, wherein
   the schedule information is identified by a Multipurpose Internet Mail Extension (MIME) type that comprises the string "application/mbms-schedule".

2. The method of claim 1, wherein
   the schedule information is delivered during a Service Announcement procedure,
   the schedule information is delivered out-of-band, or
   the schedule information is delivered in-band via MBMS.

3. The method of claim 1, wherein
the schedule information is delivered in-band via MBMS, and
the schedule information is delivered with MBMS data.

4. The method of claim 3, wherein the schedule information that is delivered in-band with the MBMS data overwrites older schedule information.

5. The method of claim 1, wherein the USD is delivered during a Service Announcement procedure.

6. The method of claim 1, wherein
the schedule information specifies an update duration or time, and
the update duration or time causes, when having passed, the UE to fetch updated schedule information.

7. The method of claim 6, wherein the update time is refreshed upon receiving a schedule information update in-band.

8. The method of claim 1, wherein the USD is valid for multiple MBMS Sessions comprised by a MBMS User Service Session.

9. The method of claim 8, wherein the MBMS Sessions are MBMS download sessions.

10. The method of claim 1, wherein the schedule reflects multiple MBMS Sessions comprised by a MBMS User Service Session.

11. The method of claim 1, wherein the schedule signals when the UE shall prepare for MBMS reception.

12. The method of claim 1, wherein the delivery of schedule information is accompanied by delivery of reception location information.

13. The method of claim 1, wherein the schedule information and the USD are delivered as separate items to the UE.

14. The method of claim 1, wherein at least one of the schedule information and the USD are delivered to the UE in the form of a file.

15. A computer program product comprising a non-transitory computer readable medium storing program code that when executed by a processor causes the processor to perform the method of claim 1.

16. A method of determining schedule information for a Multimedia Broadcast/Multicast Service (MBMS) User Service for which a User Service Description (USD) is provided, the method being performed by a user equipment (UE), and comprising:
receiving the USD and schedule information, wherein the schedule information describes a schedule for the MBMS User Service, wherein the schedule is described in the form of one or more re-occurring events and/or one or more start/stop lists, and wherein the USD has a reference or link to the schedule information; and
determining the schedule information for the MBMS User Service via the reference or link from the USD, wherein
the schedule information is identified by a Multipurpose Internet Mail Extension (MIME) type that comprises the string "application/mbms-schedule".

17. The method of claim 16, further comprising preparing for reception based on the schedule information.

18. The method of claim 17, wherein
preparing for reception comprises starting monitoring of an MBMS Control Channel for an MBMS Session, or
preparing for reception comprises activating an MBMS chipset of the UE.

19. The method of claim 16, further comprising pausing an initiated MBMS User Service based on the schedule information.

20. The method of claim 19, wherein
pausing an initiated MBMS User Service comprises stopping monitoring of an MBMS Control Channel, or
pausing an initiated MBMS User Service comprises deactivating an MBMS chipset of the UE.

21. A device for delivering schedule information for a Multimedia Broadcast/Multicast Service (MBMS) User Service for which a User Service Description (USD) is provided, the device comprising:
memory; and
processing circuitry coupled to the memory, the device being configured to:
provide schedule information describing a schedule for an MBMS User Service, wherein the schedule is described in the form of one or more re-occurring events and/or one or more start/stop lists; and
deliver the USD and the schedule information to a user equipment (UE), wherein the USD has a reference or link to the schedule information, wherein
the schedule information is identified by a Multipurpose Internet Mail Extension (MIME) type that comprises the string "application/mbms-schedule".

22. The device of claim 21, wherein the device is adapted to deliver the schedule information according to one or more of the following ways:
during a Service Announcement procedure;
out-of-band;
in-band via MBMS; and
with MBMS data.

23. The device of claim 21, wherein the schedule information specifies an update duration or time.

24. A user equipment (UE) for determining schedule information for a Multimedia Broadcast/Multicast Service (MBMS) User Service for which a User Service Description (USD) is provided, the UE comprising:
a receiver for receiving the USD and schedule information describing a schedule for an MBMS User Service, wherein the schedule is described in the form one or more re-occurring events and/or one or more start/stop lists, and wherein the USD has a reference or link to the schedule information; and
processing circuitry configured to determine the schedule information for the MBMS User Service via the reference or link from the USD, wherein
the schedule information is identified by a Multipurpose Internet Mail Extension (MIME) type that comprises the string "application/mbms-schedule".

25. A method of delivering schedule information for a Multimedia Broadcast/Multicast Service (MBMS) User Service for which a User Service Description (USD) is provided, the method comprising:
providing schedule information describing a schedule for the MBMS User Service, wherein the schedule is described in the form of one or more re-occurring events and/or one or more start/stop lists; and
delivering the USD and the schedule information to a user equipment (UE), wherein the USD has a reference or link to the schedule information, wherein
the reference or link included in the USD delivered to the UE comprises a Uniform Resource Identifier (URI) for identifying information delivered to the UE and wherein a Multipurpose Internet Mail Extension (MIME) type identifier is used to describe that the information is the schedule information,
the MIME type identifier indicates that the information identified by the URI is the schedule information, and, the MIME type identifier comprises the string "application/mbms-schedule".

\* \* \* \* \*

UNITED STATES PATENT AND TRADEMARK OFFICE
CERTIFICATE OF CORRECTION

PATENT NO. : 11,228,456 B2
APPLICATION NO. : 16/839905
DATED : January 18, 2022
INVENTOR(S) : Lohmar et al.

It is certified that error appears in the above-identified patent and that said Letters Patent is hereby corrected as shown below:

On the Title Page

In Item (56), under "OTHER PUBLICATIONS", in Column 2, Line 4, delete "(Jun. 2010)),herein 3GPP TS 26.346" and insert -- (Jun. 2010) --, therefor.

In Item (57), under "ABSTRACT", in Column 2, Line 4, delete "form" and insert -- form of --, therefor.

On Page 2, in Item (56), under "OTHER PUBLICATIONS", in Column 2, Line 4, delete "(Jun. 2010))" and insert -- (Jun. 2010) --, therefor.

In the Specification

In Column 3, Line 60, delete "MBSM" and insert -- MBMS --, therefor.

In the Claims

In Column 16, Line 39, in Claim 24, delete "form one" and insert -- form of one --, therefor.

Signed and Sealed this
Twenty-third Day of August, 2022

Katherine Kelly Vidal
*Director of the United States Patent and Trademark Office*